US008528844B2

(12) United States Patent
Horning et al.

(10) Patent No.: US 8,528,844 B2
(45) Date of Patent: Sep. 10, 2013

(54) ROLLER MILL WITH APPLICATION OF GAS

(75) Inventors: Bent Horning, Hornbak (DK);
Alexander Helm, Allerod (DK)

(73) Assignee: FLSmidth A/S, Valby (DK)

( * ) Notice: Subject to any disclaimer, the term of this patent is extended or adjusted under 35 U.S.C. 154(b) by 377 days.

(21) Appl. No.: 13/056,200

(22) PCT Filed: Jun. 1, 2009

(86) PCT No.: PCT/EP2009/056696
§ 371 (c)(1),
(2), (4) Date: Jan. 27, 2011

(87) PCT Pub. No.: WO2010/012529
PCT Pub. Date: Feb. 4, 2010

(65) Prior Publication Data
US 2011/0127359 A1   Jun. 2, 2011

(30) Foreign Application Priority Data
Jul. 30, 2008   (DK) .......................... PA 2008 01050

(51) Int. Cl.
*B02C 23/26*   (2006.01)
(52) U.S. Cl.
USPC ............................................ 241/57; 241/119
(58) Field of Classification Search
USPC .................. 241/18, 57, 58, 117–121
See application file for complete search history.

(56) References Cited

U.S. PATENT DOCUMENTS

| | | | | |
|---|---|---|---|---|
| 8,037 A | * | 4/1851 | Hanon-Valcke | 241/41 |
| 1,875,817 A | * | 9/1932 | London | 241/58 |
| 3,491,954 A | | 1/1970 | Miller | |
| 4,715,544 A | * | 12/1987 | Folsberg | 241/57 |
| 5,971,302 A | * | 10/1999 | Doumet | 241/17 |
| 8,109,458 B2 | * | 2/2012 | Hanghoj et al. | 241/117 |
| 8,109,459 B2 | * | 2/2012 | Nissen et al. | 241/120 |
| 8,113,452 B2 | * | 2/2012 | Folsberg et al. | 241/57 |

FOREIGN PATENT DOCUMENTS

| | | | |
|---|---|---|---|
| EP | 0068681 A | | 1/1983 |
| GB | 2100617 A | | 1/1983 |
| WO | WO 2009003528 A1 | * | 1/2009 |
| WO | 2009074363 A | | 6/2009 |
| WO | WO 2010113119 A1 | * | 10/2010 |

OTHER PUBLICATIONS

Written Opinion of the International Searching Authority of Application PCT/EP2009/056696.
International Search Report for PCT/EP2009/056696 dated Sep. 16, 2009.

* cited by examiner

*Primary Examiner* — Dana Ross
*Assistant Examiner* — Leonel Vasquez
(74) *Attorney, Agent, or Firm* — Buchanan Ingersoll & Rooney PC

(57) ABSTRACT

A roller mill for grinding particulate material such as cement raw materials, cement clinker and similar materials includes a mill housing, a substantially horizontal and stationary grinding table, and a number of rollers each rotating about a roller shaft which is connected to a rotatable vertical shaft centrally positioned relative to the stationary grinding table. The rollers are configured for interactive operation with the grinding table. The grinding table is stationary. The roller mill also includes at least one first device utilized for introducing gases into the mill housing and at least one second device for continuously diverting ground material suspended in gases out of the mill housing. As a consequence hereof, the process for the roller mill with a stationary grinding table will be continuous and the diameter of the grinding table will not be subject to limitations.

11 Claims, 4 Drawing Sheets

ROLLER MILL WITH APPLICATION OF GAS

CROSS REFERENCE TO RELATED APPLICATIONS

The present patent application is the United States national phase under 35 U.S.C. §371 of International Application No. PCT/EP2009/056696, filed on Jun. 1, 2009, and claiming priority to Danish Patent Application No. PA 2008 01050, filed on Jul. 30, 2008. The entirety of both of these applications are incorporated by reference herein.

FIELD OF INVENTION

The present invention relates to a roller mill for grinding particulate material such as cement raw materials, cement clinker and similar materials, said roller mill comprises a mill housing, a substantially horizontal grinding table and a number of rollers each rotating about a roller shaft which is connected to a rotatable vertical shaft centrally positioned relative to the grinding table where the rollers are configured for interactive operation with the grinding table. The invention also relates to a method for carrying out the invention.

BACKGROUND OF THE INVENTION

A machine of the aforementioned kind is known from DE 2061422 A1. This machine, which is a mixing machine, is utilized in the foundry industry for mixing water, sand and a binding agent into a viscous mass of molding sand. Here a central shaft rotates a set of rollers operating interactively with a stationary table which is configured as a container to prevent outflow of water from the container. This is a discontinuous process which means that after the material on the table has been finally mixed, it will be necessary to stop the mixing machine to remove the material before a new quantity of water, sand and binding agent can be added. Timewise it is a distinct problem that the machine has to be stopped, and the removal of the material is also a labour-intensive process.

Furthermore, roller mills are generally known in the cement manufacturing industry and they are extensively described in the patent literature. Hence, from GB 2100617 A is known a roller mill with a number of rollers operating interactively with a horizontally rotating grinding table to which raw material continuously is fed. The rollers have stationary roller shafts and therefore they are not rotatable relative to a vertical axis. The rollers are forced against the grinding table by means of external spring-supported force mechanisms, for example in the form of hydraulic or mechanical springs. In this roller mill the grinding table is surrounded by a nozzle ring and through this nozzle ring a gas flow passes, being generated by a fan, with entrainment of the material discharged from the rotating grinding table which is very finely ground. This provides for a continuous grinding process due to the fact that the ground material is continuously removed from the grinding table while at the same time fresh raw material is fed to the center of the grinding table. In this type of mill, rotation of the grinding table is a specific requirement to ensure that the centrifugal force thus produced will force material fed to the center of the grinding table outward to the rollers and from there onward to the edge of the table from which the gas flow through the nozzle ring continues the transport of the material, normally to a separator. All roller mills of this type are characterized in that a mutually limiting interaction exists between the diameter of the grinding table and the rotational speed of the grinding table and in that they depend upon the permissible size of the centrifugal field as determined by experience. This is a significant disadvantage since it makes it impossible to increase the capacity of the roller mill by increasing the rotational speed of the grinding table and the diameter of the grinding table after the interrelationship between them has reached a certain level. The following formula for the maximum interrelationship between the rotational speed of the grinding table and the diameter of the grinding table applies for this type of roller mill:

$$\omega = K/D^{0.5}$$

where,
$\omega$=rotational speed of the table [rad/s]
K=constant which is experimentally determined and dependent on the roller mill design and the nature of grinding material [$m^{0.5}$/s]
D=the diameter of the table [m]

As a consequence hereof, for roller mills with rotating tables where the upper limits for table speed and table diameter have been reached it will only be possible to increase the capacity by increasing the grinding pressure. Increasing the grinding pressure is not desirable for several reasons, i.a. because it will increase the stress loads imposed on the roller mill components, hence calling for greater strength characteristics of these components. The need to comply with the aforementioned formula is thus a problem if the capacity of the roller mill is to be increased. In case of non-compliance with the formula, the roller mill vibrations will reach a level which is so high that it will not be possible to achieve satisfactory operating conditions. Also, a higher vibration level will increase the requirements applying in terms of the mechanical strength of the roller mill components. Therefore, it is a well-known fact in the industry that compliance with the mentioned formula, or similar formulae, for the interrelationship between the grinding table diameter and grinding table speed must be ensured, and all roller mills of this type in operation today comply with the mentioned formula or similar formulae.

SUMMARY OF THE INVENTION

It is the purpose of the present invention to provide a roller mill by means of which the described disadvantages are eliminated.

This is obtained by a roller mill of the kind mentioned in the introduction, and characterized in that the grinding table is stationary and in that the roller mill comprises at least one device, at least one mechanism or at least one apparatus that is configured to introduce at least one gas into the mill housing and at least one device, at least one mechanism, or at least one apparatus for continuously diverting ground material suspended in gases out of the mill housing.

This will ensure that the grinding process for a roller mill with a stationary grinding table is continuous, and eliminate the need for the diameter of the grinding table to comply with the aforementioned formula, $\omega=K/D^{0.5}$.

Until now it was believed that the only feasible way to transport ground material to the gases flowing through a nozzle ring, which encloses the grinding table, was by rotation of the grinding table. Quite surprisingly, it has been ascertained that a set of rollers which is connected to and rotating about a vertically rotatable shaft by itself can ensure that ground material, without rotation of the grinding table, is whirled up and brought into contact with the gases introduced into the mill housing thereby forming a gas/material suspension allowing the material to be continuously diverted from the grinding zone of the grinding table. The ground material suspended in gases is subsequently drawn through an outlet in the upper part of the mill housing by means of a fan. The fact that the ground material is brought into contact with the gases is mainly ascribable to the gas flows in the grinding area arising in response to the movement of the entire roller arrangement, where the roller arrangement comprises the rollers, roller shafts and the vertical roller shaft, and the fact that the ground material deposited on or present in immediate proximity of the rollers will be thrust away from the rollers by the rotation of the latter. The rotational speed of the roller arrangement must as a minimum be sufficient to bring the ground material into contact with the introduced gases so that the ground material is suspended in the gases. This means that it now is possible to manufacture roller mills with stationary grinding tables in which the ground material is suspended in gases introduced in the mill housing and continuously removed, in combination with the fact that the capacity of the roller mill is not restricted to the previously mentioned formula. Hence it will be possible to increase significantly the capacity of such roller mills, compared to the capacity of the known roller mills.

Also a roller mill of this kind will be particularly suitable for grinding material to a very fine particle size since the vibration level, because of the stationary table, is very low. Generally it can be said that the vibration level in a roller mill is the limiting factor for the fineness level to which the material can be ground. This means that the roller mill will be suitable for many purposes, such as, for example, grinding cement clinker into finished cement. Such a roller mill will also significantly enhance the capability to control the fineness of the material as compared to grinding being performed in a mill with a rotating grinding table, since, to a greater extent, it will be possible to control the rate of processing of the grinding material before it is directed to the separator. This possibility arises from the fact that there is no rotation of the table, which means that the particles not necessarily automatically are removed after they have reached a certain fineness level. This is particularly advantageous in connection with the grinding of material where the fineness is of paramount importance for the final use of the material.

The one or more devices, mechanisms or apparatuses utilized for introducing gases into the mill housing may in principle be constituted by any suitable means. For example, at least one device for introducing at least one gas into the mill housing may be positioned at any location in the mill, as long as the at least one device will ensure that gases are introduced in an appropriate manner. However, it is preferred that the one or more devices comprises a number of nozzles mounted above the grinding table in the mill housing. The nozzles may be mounted horizontally in the wall of the mill housing, immediately above the grinding table, so that they allow the gases to be introduced radially relative to the grinding table. The nozzles may be rotatably mounted to allow the angle relative to the horizontal grinding table to be altered. Hence it will be possible to adjust the nozzles in order to optimize the efficiency of the gases introduced. Also the nozzles may be mounted elsewhere in the mill housing, for example in the upper section of the mill housing. Here it is preferred that the nozzles point in a direction towards the grinding table, thereby ensuring that the gases make contact with the ground material. Furthermore, a combination of the mentioned nozzle positions may be necessary in order to obtain an optimized suspension and diversion. The ground material suspended in gases may be extracted through an outlet in the upper part of the mill housing by means of a fan.

In a second embodiment, the one or more devices for introducing gases comprise a number of nozzles mounted in the grinding table. The nozzles may be through-going drilled holes in the grinding table, possibly angled relative to the vertical shaft, to allow gases to be introduced from the underside of the table and upward to the mill housing above the grinding table. Hence it will be possible to ensure that the gases are introduced precisely to the area of the grinding table where this is deemed to be preferable.

In a third embodiment the one or more devices for introducing gases into the mill housing comprise a number of nozzles, arranged at the outer circumference of the grinding table, connected to form a nozzle ring which encloses the grinding table.

In another embodiment the one or more devices for introducing gases into the mill housing comprise a number of vertical louvers being movable arranged around the grinding table so that the introduction of the gases can be controlled by adjusting the angles of the louvers. The vertical louvers can be combined with the other mentioned types of nozzles in order to achieve an optimum gas flow in the mill housing.

In a further embodiment the one or more devices for introducing gases into the mill housing comprise two or more separate feed systems each comprising a mechanism such as a fan for introducing gases into the mill housing. One system could be capable of introducing gases through the nozzle ring enclosing the grinding table or the through-going holes in the grinding table, whereas the second system could be capable of introducing gases through the nozzles which are mounted in the mill housing. Hence it is possible to introduce the atmospheric air surrounding the roller mill through one system and hot gases through the second system or conversely. For energy efficiency, it would be advantageous to distribute the gas flow into a cold flow which is blown into the roller mill and into a hot flow which is sucked into the roller mill by a fan at a relatively low pressure loss. Furthermore, it is advantageous when some of the gases being introduced into the mill housing are made up of atmospheric air since this would lessen the requirements imposed upon the materials and components of the feed system as compared to a feed system for introducing hot gases. The relationship between the quantity of hot gases and air, respectively, must be optimized relative to the process in the mill in order to minimize the energy consumption for the grinding process and the air flow process. For all types of nozzles, the gases can either be blown or sucked through the nozzles. Atmospheric air for one feed system may, for example, be introduced by blowing the air up through the nozzle ring around the grinding table using a fan while hot gases for the second feed system may be introduced by sucking the gases through the nozzles mounted in the mill housing by means of a second fan which is connected to the outlet at the top of the mill housing. The conversely situation with hot gases through the nozzle ring and atmospheric air through the nozzles in the mill housing or an embodiment with hot gases in both feed systems would also be applicable.

All the mentioned devices for introducing gases in the mill housing can be combined with each other in order to achieve an optimum gas flow in the mill housing.

In a further embodiment of the invention each roller shaft is connected to the rotatable vertical shaft through a hinged connection with a center of rotation allowing a free circular movement of the roller in upward and downward direction in a plane comprising the centerline of the roller shaft. It is preferred that the center of rotation of the hinged connection in a vertical plane is arranged under the centerline of the roller shaft. Hence it will be possible to increase the grinding pressure without application of force mechanisms. This is ascribable to the fact that the centrifugal force which acts upon the roller, the roller shaft and the hinged connection during the operation of the mill, will, because of the special design as defined above, generate a torque around the hinge and hence a downwardly directed force towards the grinding table.

Other details, objects, and advantages of the invention will become apparent as the following description of certain present preferred embodiments thereof and certain present preferred methods of practicing the same proceeds.

BRIEF DESCRIPTION OF THE DRAWINGS

The invention will now be described in further detail with reference to the drawings being diagrammatical, and the embodiments of roller mills shown in those drawings where.

DETAILED DESCRIPTION OF PRESENT PREFERRED EMBODIMENTS

Figure 1:
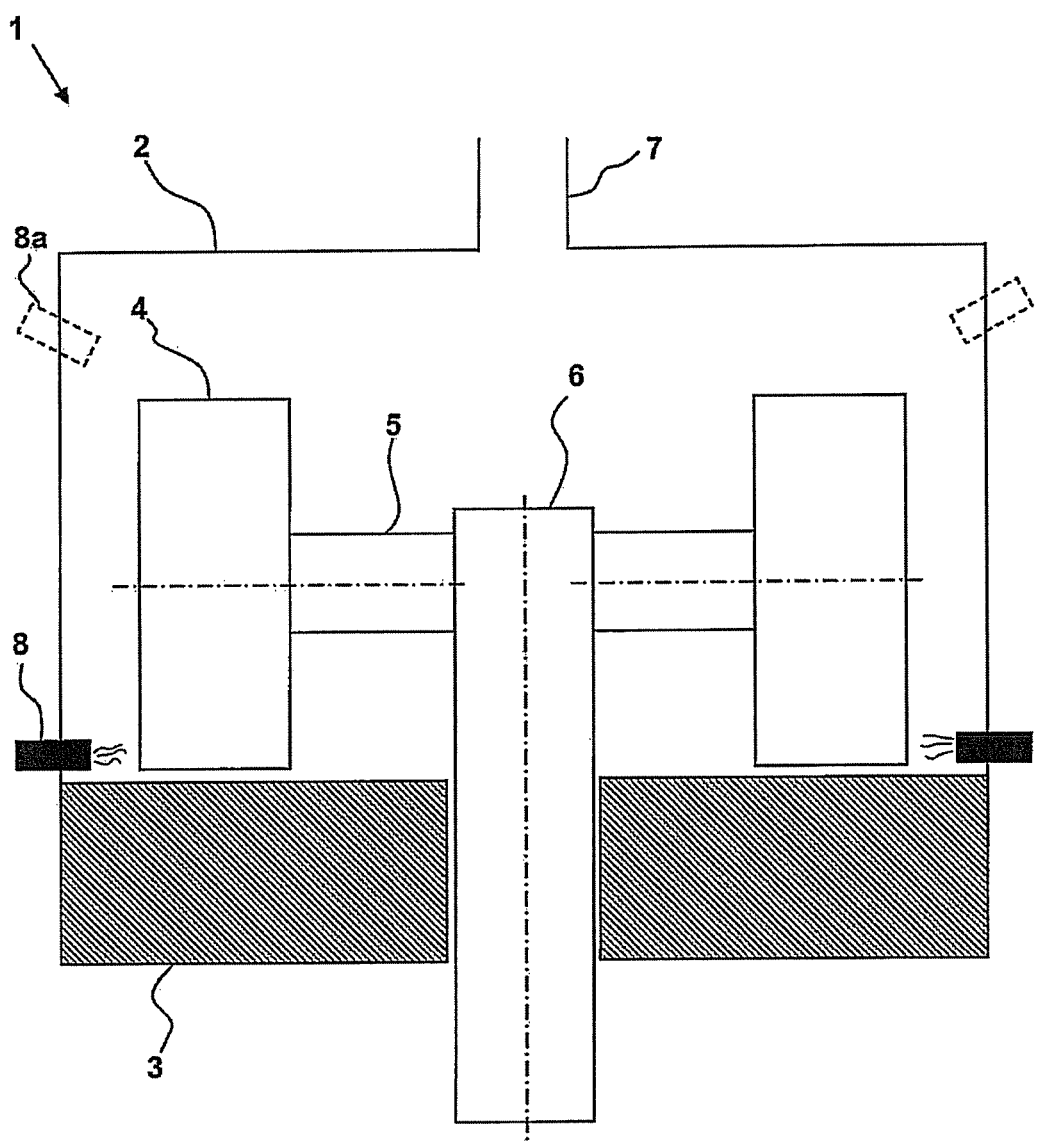
FIG. 1 shows a sectional view of a roller mill according to the invention.

FIG. 1 shows a roller mill 1 comprising a mill housing 2 which encloses a horizontal grinding table 3 and a number of rollers 4 individually rotating about a separate roller shaft 5. The roller shafts 5 are connected to a rotatable vertical shaft 6 which is centrally positioned relative to the grinding table 3. The rollers 4 are configured for interactive operation with the grinding table 3 which is stationary. The raw material is continuously fed to the grinding table 3 through a feed inlet (not shown). Nozzles 8 for introducing gases are mounted in the wall of the mill housing 2. The nozzles 8 may be horizontally positioned in the mill housing 2 immediately above the grinding table, thereby introducing gases radially relative to the grinding table 3. Furthermore, the nozzles 8 may be movably mounted so that the angle relative to the horizontal grinding table 3 can be altered. Nozzles can also be mounted elsewhere in the mill housing. For example nozzles 8a may be mounted at the upper end of the mill housing as shown in dotted lines, either alone or in combination with the nozzles 8. Here it is preferred that the nozzles 8a point in a direction towards the grinding table 3 so as to ensure that the gases are brought into contact with the ground material. The ground material suspended in gases is extracted by a fan (not shown) through an outlet 7 in the upper part of the mill housing 2.

Figure 2:
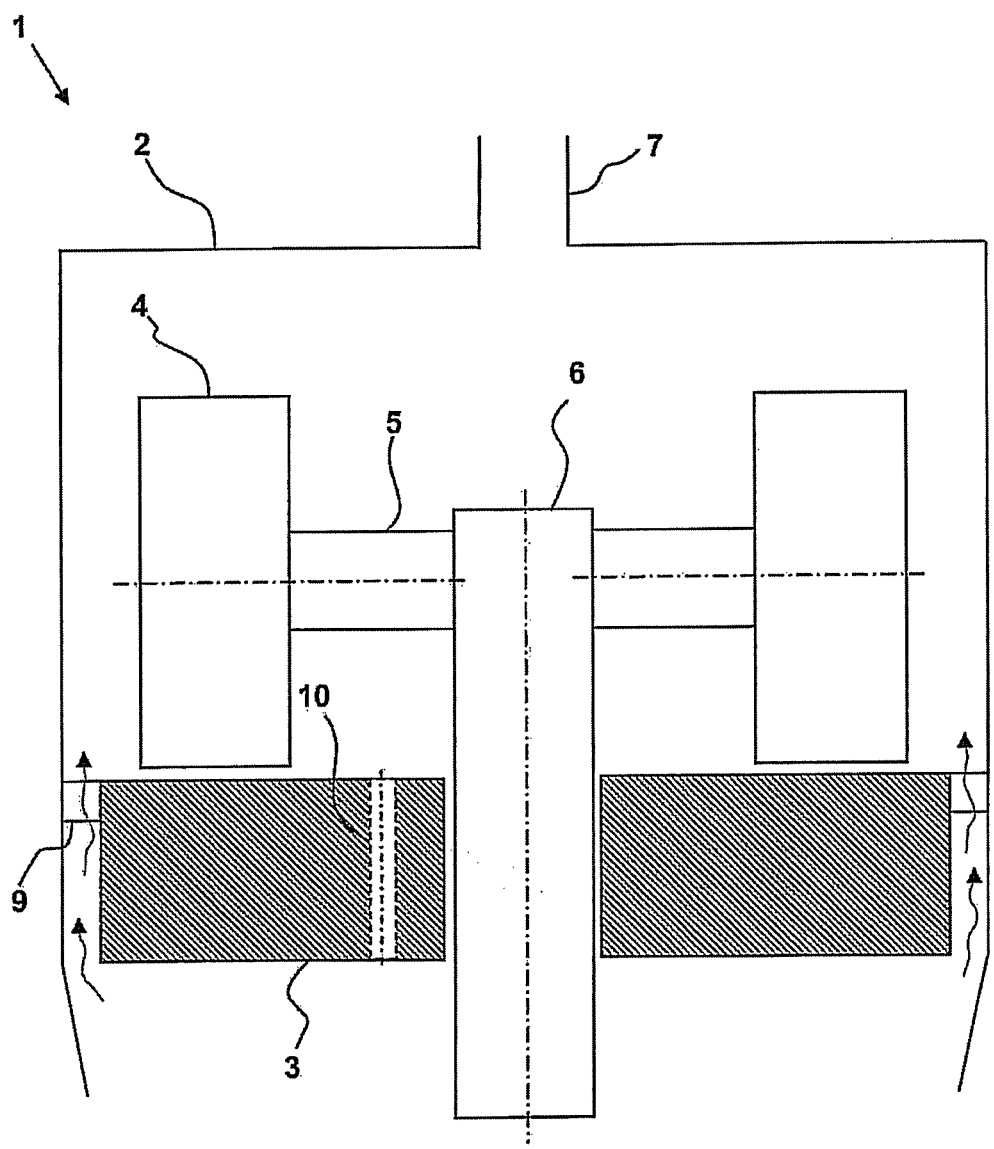
FIG. 2 shows a sectional view of a further embodiment of a roller mill according to the invention.

FIG. 2 shows a further embodiment of the roller mill. Here the gases are introduced via a nozzle ring 9 which encloses the grinding table 3 completely. Also it is shown in FIG. 2 that gases may be introduced through one or several nozzles 10 mounted in the grinding table 3. These nozzles may be through-going holes 10 in the grinding table 3, and they may be angled relative to the vertical shaft 6. The nozzles 9, 10 can operate together with the nozzles 8, 8a (shown in FIG. 1) which are mounted in the wall of the mill housing 2.

Figure 3:
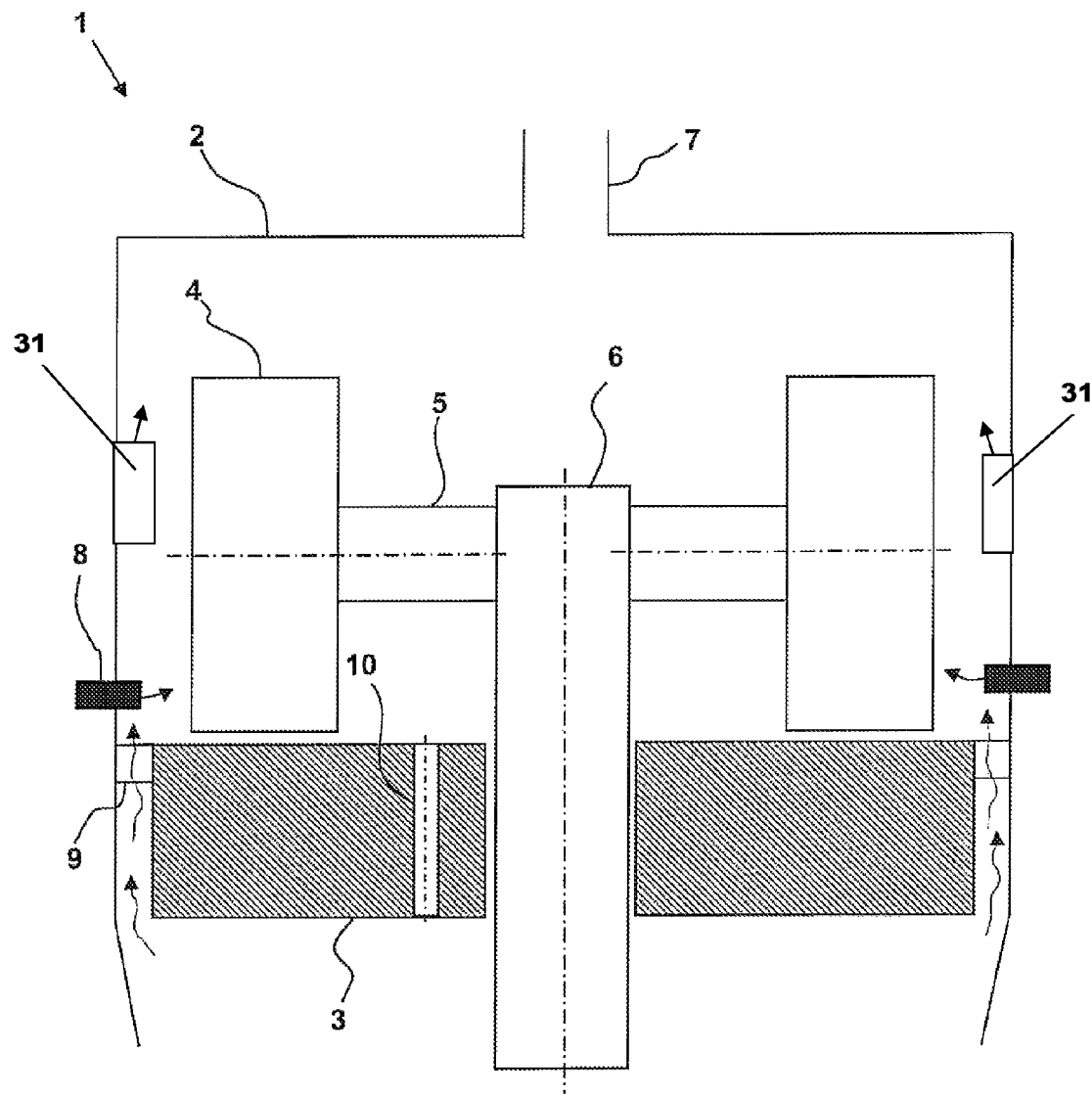
FIG. 3 shows a sectional view of a further embodiment of a roller mill according to the invention.

FIG. 3 shows a further embodiment of the invention featuring two separate feed systems for introducing gas into the mill housing 2. Only the nozzles of the feed systems are shown in the figure. One system introduces gases through the nozzle ring 9 and/or through-going holes 10 in the grinding table 2, whereas the second system introduces gases through the nozzles 8 which are mounted in the wall of the mill housing 2. Introduction of gases in the one system is effected by the gases being sucked up through the nozzle ring 9 around the grinding table and/or through-going holes 10 in the table, by means of a fan which is connected to the outlet 7 at the top of the mill housing 2, whereas gases for the second feed system is effected by the gases being blown through the nozzles 8 in the wall of the mill housing 2 by means of a second fan. Hence it is possible to introduce hot gases through the one system while introducing the atmospheric air surrounding the roller mill through the second system. A number of vertical louvers 31 may be movably arranged around the grinding table so that the introduction of the gases can be controlled by adjusting the angles of the louvers 31. The vertical louvers 31 can be combined with the other mentioned types of nozzles in order to achieve a desired optimum flow of gas in the mill housing.

Figure 4:
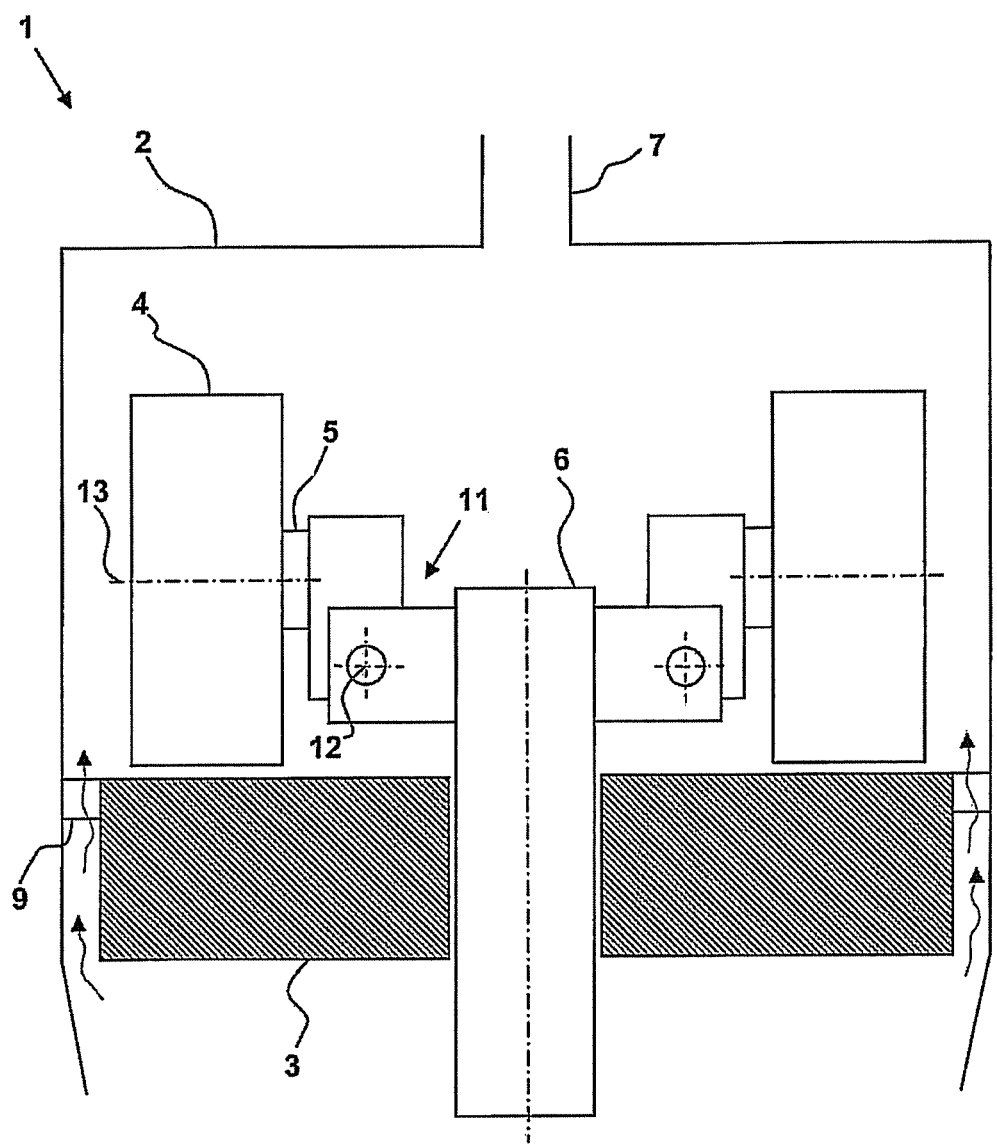
FIG. 4 shows a sectional view of a further embodiment of a roller mill according to the invention.

FIG. 4 shows a further embodiment of the invention where the roller shafts 5 are connected to the vertical shaft 6 through a hinged connection 11 with a center of rotation 12 allowing a free circular movement of the roller 4 in upward and downward direction in a plane comprising the centerline 13 of the roller shaft 5. It is preferred that the center of rotation 12 of the hinged connection 11 in a vertical plane is arranged under the centerline 13 of the roller shaft 5. Hence it will be possible to increase the grinding pressure without application of force mechanisms. This is due to the fact that the centrifugal force, acting upon the roller 4, the roller shaft 5 and the hinged part 11 during the operation of the mill, will, because of the special design as discussed above, generate a torque around the hinge 11 and thus a downwardly directed force towards the grinding table 3.

While certain present preferred embodiments of the roller mill and certain embodiments of methods of practicing the same have been shown and described, it is to be distinctly understood that the invention is not limited thereto but may be otherwise variously embodied and practiced within the scope of the following claims.

The invention claimed is:
1. A roller mill comprising:
a mill housing;
a grinding table, the grinding table being stationary;
a plurality of rollers, each of the rollers rotating about a roller shaft connected to a rotatable vertical shaft centrally positioned relative to the grinding table where the rollers are configured for interactive operation with the grinding table to crush material; and
at least one first device for introducing at least one gas into the mill housing; and
at least one second device for continuously diverting ground material suspended in the at least one gas out of the mill housing; and
wherein the at least one first device for introducing the at least one gas into the mill housing comprises nozzles mounted in the grinding table.

2. The roller mill of claim 1 wherein the at least one first device for introducing the at least one gas into the mill housing also comprises a number of nozzles mounted above the grinding table in the mill housing.

3. The roller mill of claim 1 wherein the at least one first device for introducing the at least one gas into the mill housing also comprises a nozzle ring that encloses the grinding table.

4. The roller mill of claim 1 wherein the at least one first device for introducing the at least one gas into the mill housing also comprises a number of vertical louvers being movably arranged around the grinding table.

5. The roller mill of claim 1 wherein the at least one first device for introducing the at least one gas into the mill housing comprises two or more separate feed systems each comprising a fan or other mechanism for introducing at least one gas into the mill housing.

6. The roller mill of claim 5 wherein a first feed system of the feed systems is introducing the at least one gas through at least one of a nozzle ring or the nozzles mounted in the grinding table and a second feed system of the feed systems is introducing the at least one gas through nozzles mounted in the mill housing; and wherein the at least one first device also comprises the nozzles mounted in the mill housing and the nozzle ring.

7. The roller mill of claim 1 wherein each roller shaft is connected to the rotatable vertical shaft via a hinged connection that has a center of rotation allowing a free circular movement of the roller rotating about that roller shaft in upward and downward direction in a plane comprising a centerline of the roller shaft and in that the center of rotation of the hinged connection in a vertical plane is arranged under the centerline of the roller shaft.

8. The roller mill of claim 1 wherein the at least one second device is comprised of a fan or other mechanism in communication with at least one outlet of the mill housing for continuously diverting the ground material suspended in the at least one gas out of the mill housing.

9. The roller mill of claim 1 wherein the at least one second device is comprised of at least one outlet connected to the mill housing.

10. The roller mill of claim 1 wherein the nozzles are mounted in the grinding table such that the nozzles are holes drilled in the grinding table.

11. The roller mill of claim 1 wherein at least some of the nozzles mounted in the grinding table are holes that are drilled through the grinding table that are angled relative to the vertical shaft so that the at least one gas is introducible from an underside of the grinding table.

* * * * *